United States Patent [19]

Biswas et al.

[11] Patent Number: 4,592,932
[45] Date of Patent: Jun. 3, 1986

[54] HERMETIC COATING FOR AN OPTICAL FIBER

[75] Inventors: Dipak R. Biswas; Satyabrata Raychaudhuri, both of Roanoke, Va.

[73] Assignee: ITT Corporation, New York, N.Y.

[21] Appl. No.: 624,643

[22] Filed: Jun. 26, 1984

[51] Int. Cl.$^4$ .......................... G02B 5/14; B05D 1/18
[52] U.S. Cl. ..................................... 427/163; 65/3.11; 204/20; 204/38.4
[58] Field of Search .................. 65/3.11; 204/20, 38.4; 350/96, 29; 427/163

[56] References Cited

U.S. PATENT DOCUMENTS

| | | | |
|---|---|---|---|
| 4,390,589 | 6/1983 | Geyling et al. | 427/163 X |
| 4,418,984 | 12/1983 | Wysucki et al. | 65/3.11 |
| 4,485,122 | 11/1984 | Williams et al. | 427/163 X |

Primary Examiner—James R. Hoffman
Attorney, Agent, or Firm—John T. O'Halloran; Mary C. Werner

[57] ABSTRACT

An optical fiber which has just been drawn from an optical preform is provided with two external hermetic coatings. The primary coating is a metallic coating provided by, for example, using a heterogeneous nucleation thermochemical deposition technique. This technique involves passing the fiber through a reaction zone which contains a gaseous medium that includes a reactant which decomposes, or a mixture of reactants which chemically react, at a predetermined temperature to form the material of the coating. The second coating is provided by immersing the fiber in a deposition bath containing a liquid medium which includes at least one reactant capable of deposition onto the primary coating to form a secondary coating. The deposition process may be achieved by applying a current through the medium at a predetermined temperature or by including reactants in the medium which will deposit at predetermined temperatures without applying a current. The resulting fiber may then be provided with an additional polymer coating layer.

6 Claims, 3 Drawing Figures

HERMETIC COATING FOR AN OPTICAL FIBER

BACKGROUND OF THE INVENTION

This invention relates generally to a method of coating optical glass fibers and in particular to such a method that is carried out immediately after the fiber is formed which results in reducing abrasion to the fiber and interaction of the environment with the fiber, and increasing the life time of the fiber during both storage and use.

Glass optical fibers when initially formed have high tensile strengths. After extended periods of use or storage the optical fibers may break when subjected to tensile stresses substantially lower than the original tensile strength rating of the fiber. One reason for this breakage, known as static fatigue, is the development of surface imperfections along the glass outer perimeter which form microcracks. This fatigue is at least in part attributable to the presence of water molecules and hydroxyl groups on the glass surface of the fibers. The water attacks the surface and causes formation of weak bonds which are broken by applied stress.

With glass-on-glass optical fibers where the core comprises a glass material and the cladding comprises a glass material, the presence of water molecules on the outer glass surface tends to cause the glass structure on the outer surface to become substantially weakened over a period of time so that the fiber ruptures under stress forces that would be incapable of causing the fibers to fracture in the absence of water or water vapor.

In the fiber forming operation, for example, fiber drawing, the glass-on-glass optical fiber is frequently coated with a polymer, such as a silicone resin immediately after formation in order to preserve its pristine strength and for handling ease. Although the silicone material is effective to prevent dust particles from contacting the outer glass surface, the silicone material is relatively pervious to water. Over a period of exposure in air, at ordinary concentrations of water vapor, water is able to permeate through the silicone layer and to interact with the outer glass surface, with the above-mentioned deleterious consequences.

The same mechanism of static fatigue occurs with plastic clad optical fibers where the core material comprises silica or other glass and the cladding comprises a silicone material or other polymer.

One method that has been employed in each of these fibers to overcome the problem of water penetration is the application of a thermoplastic resin over the silicone material. Although the extruded thermoplastic jacket covering the silicone material reduces the penetration of water through the silicone layer to some degree, water still can permeate through the jacket to the silicone material and from there to the glass surface of the core, again resulting in degradation of the core glass strength.

An alternative to using the silicone process is sealing the drawn fiber surface from the surrounding environment by coating the initially formed fiber with a metallic material, such as aluminum or nickel, or with a dielectric material, such as silicon nitride or tin oxide. Such sealing can be performed by using chemical vapor deposition (CVD). However, the CVD process has several disadvantages such as impingement of coating particles that are formed in a gaseous medium against the pristine glass fiber to produce surface damage, non-uniform coating thickness and large grains of coating material.

The interaction of coating particles with the fiber surface can be eliminated and an initially hermetic coating on the fiber may be obtained by means of a heterogeneous nucleation thermochemical deposition (HNTD) process thus preventing the degradation of fiber strength over the lifetime of the fiber. The HNTD process may be used to apply either a metallic or a dielectric coating to the fiber surface. Important considerations in using the HNTD process are the surface temperature of the fiber and the deposition time. While the surface temperature can be maintained adequately, the thickness of the primary coating is usually thin, that is, much less than one micron for a fiber draw speed of approximately 20–40 meters per minute. A thicker coating is preferable for maintaining hermeticity.

OBJECTS OF THE INVENTION

Accordingly, it is an object of the present invention to avoid the disadvantages of the prior art.

More particularly, it is an object of the present invention to develop a method for forming a uniform and adequately thick coating on an optical fiber to provide hermeticity.

Another object of the present invention is to provide a hermetic coating of a sufficient thickness on an optical fiber to provide mechanical strength.

It is an additional object to develop an apparatus for performing the above method.

It is still another object of the present invention to construct apparatus of the type here under consideration so as to be simple in construction, inexpensive to manufacture, and reliable in operation.

An additional object of the present invention is to design the apparatus of the above type so as to be capable of depositing the hermetic coating on the fiber without reducing the mechanical strength of the fiber.

SUMMARY OF THE INVENTION

In pursuance of these objects and others which will become apparent hereafter, the present invention provides a method and apparatus for hermetically sealing an optical fiber immediately after formation. This is accomplished by providing the optical fiber with two coatings, both of which are metallic coatings.

One feature of the present invention resides in a method of forming a secondary coating by passing the fiber through a liquid deposition bath containing a liquid medium which includes at least one reactant capable of deposition at a predetermined temperature onto the primary coating to form the secondary coating.

BRIEF DESCRIPTION OF THE DRAWING

Above-mentioned and other features and objects of this invention will become more apparent by reference to the following description taken in conjunction with the accompanying drawing, in which:

FIG. 3 is a cross-sectional view of a coated fiber as produced by the apparatus of FIG. 1 or FIG. 2.

DETAILED DESCRIPTION OF THE PREFERRED EMBODIMENT

Figure 1:
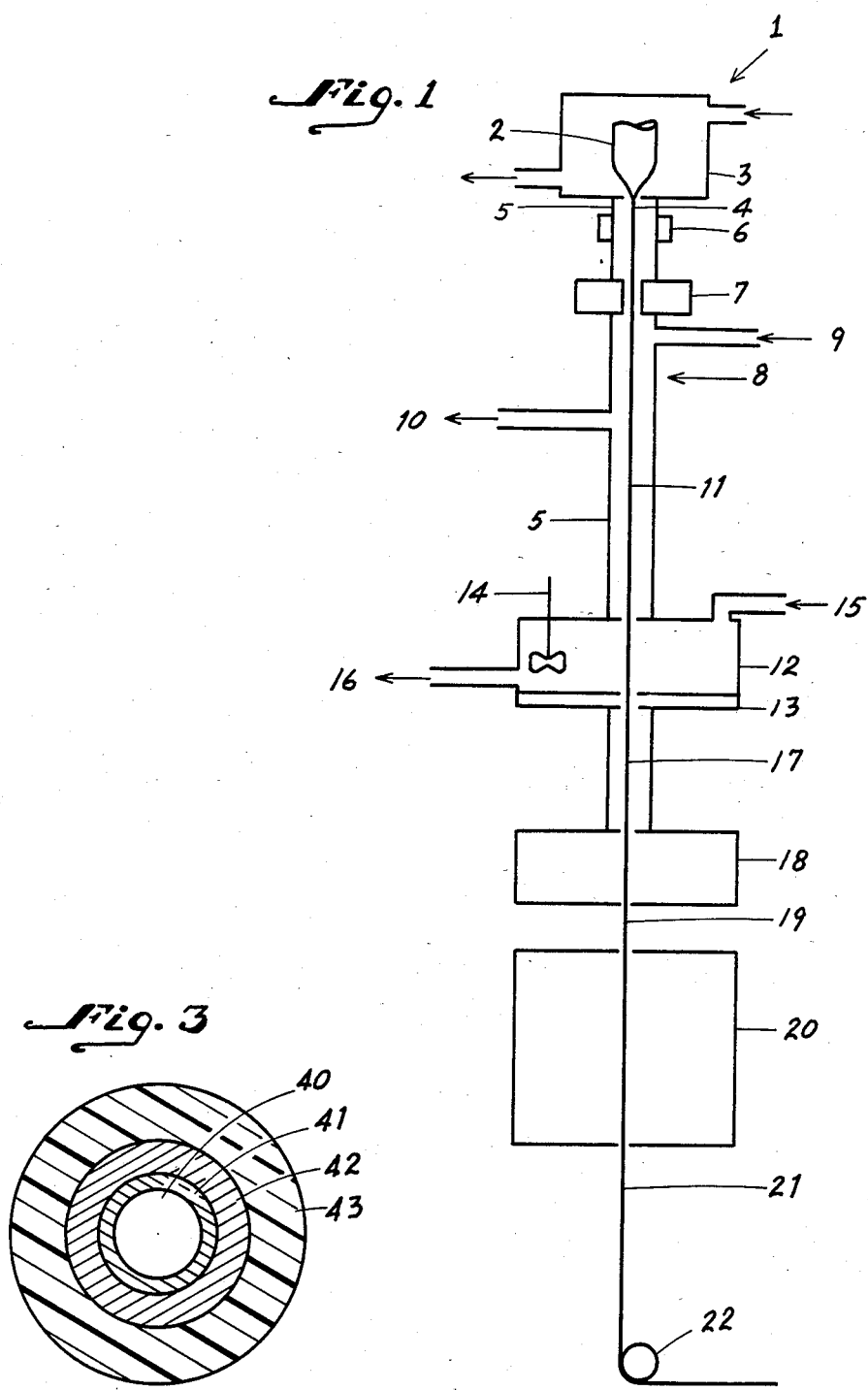
FIG. 1 is a diagrammatic side elevational view of an apparatus according to the present invention for producing a coated fiber.
Figure 2:
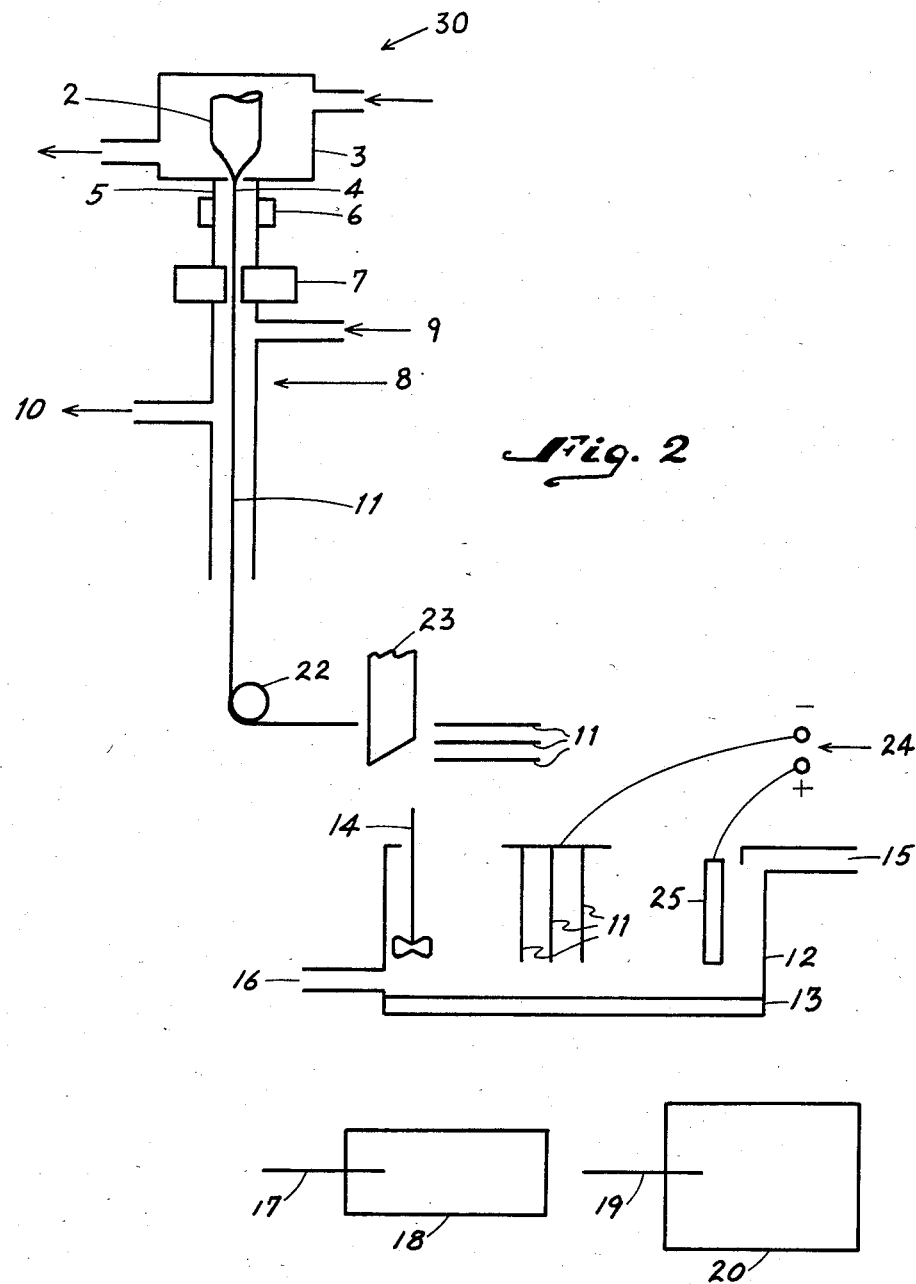
FIG. 2 is a view similar to FIG. 1 but showing a modified construction of the apparatus of the present invention.

Referring more particular to the drawings, where like reference characters designate like parts, apparatus for producing primary and secondary coatings on an optical fiber is depicted in FIG. 1 generally as reference numeral 1. In FIG. 1, an optical fiber 4 is drawn from a preform 2 by a drawing mechanism 22 mounted at the end of the apparatus 1 and is hermetically sealed during such drawing process. Apparatus for producing the primary coating on an optical fiber is generally depicted in FIG. 2 as reference numeral 30. In FIG. 2, the optical fiber 4 is drawn from the preform 2 by the drawing mechanism 22 which is mounted at the end of a primary reactor 8. The optical fiber 4 is drawn in a draw furnace 3 in a conventional manner. The portion of the preform 2 which is received in the draw furnace 3 is heated in a conventional manner, such as by hot gases, a plasma flame or by radiation.

As may be seen in FIG. 3, the formed fiber 4 in its final condition existing after it has emerged from the curing oven 20 includes an optical fiber 40, such as glass or the like, a primary hermetic metallic coating 41 produced by, for example, the heterogeneous nucleation thermochemical deposition process in a reactor 8, a secondary metallic coating 42 produced by the process of the present invention and an outer coating 43 of organic material which is produced in the polymer coater 18 and cured in a curing oven 20.

When the fiber is drawn from a solid preform, it passes through a polymer coater to preserve the pristine fiber surface and for handling ease as is conventional in fiber drawing processes. Thus, the primary coating and the secondary coating processes of this invention have to be carried out in between the drawing furnace 3 and the polymer coater 18.

Referring again to FIGS. 1 and 2, immediately after leaving the draw furnace 3, the primary coating is applied to the outer surface of the fiber. The freshly drawn fiber 4 must be provided with the primary coating 21 prior to suffering any appreciable damage due to environmental influences. To achieve this, the draw furnace 3 and the reactor 8 may either be situated directly above one another or form a structural unit by having a common housing or, as shown in FIGS. 1 and 2, a tubular shielding element 5 may be interposed between the draw furnace 3 and the reactor 8. The fiber 4 then passes through the interior of the shielding element 5 and is thus protected from environmental influences. A particular advantage of this latter approach is that the shielding element 5 may be provided with a diameter controller, designated as 7 in FIGS. 1 and 2, to permit supervision of the drawing operation.

One process of applying the primary coating is by means of a heterogeneous nucleation thermochemical deposition (HNTD) process as described in co-pending application Ser. No. 382,856, filed May 28, 1982, in the names of D. R. Biswas and D. K. Nath, incorporated herein by reference. In this process the fiber 4 passes into the interior of the reactor 8 which has an inlet port 9 into which a reactant gas is admitted and an outlet port 10 from which the spent reactant gas is discharged. The reactant gas consists of or contains at least one reactant or substance which, when heated to a predetermined temperature, releases the material of the hermetic coating which is to be applied to the exterior of the fiber 4 in the primary reactor 8. It may be seen that the reactant gas passes through the primary reactor 8 in cocurrent flow to the advancement of the fiber 4 through the reactor 8.

The vapor of the volatile metal compounds constituting the reactants is generated by evaporation. This evaporation may be accomplished either by heating a volatile compound or by passing a non-reactive gas over or through the volatile compound and reacting into metal immediately at the surface of the fiber 4 with simultaneous deposit. Any volatile byproducts must be transported away through the exhaust 10.

A preheater 6 which may be a resistance heating furnace, a quartz heating element or any other suitable means is also shown in FIGS. 1 and 2. A preheater may be provided if desired. The purpose of the preheater is only to raise the surface temperature of the fiber if that temperature drops below the temperature level necessary for deposition of the primary coating.

While we have described the formation of the primary coating using the HNTD process, it is clear that this process may be used with an optical fiber which has a metallic coating deposited by any other suitable means as long as that metallic coating provides the basis necessary for the deposition and adherence of a secondary coating having strength, uniformity and hermeticity.

Referring still to FIGS. 1 and 2, it may be seen that the fiber 11 which has acquired the primary hermetic coating in the reactor 8 is conducted through the shielding element 5 into a liquid deposition bath 12. In FIG. 1, the fiber 11 is conducted into the liquid deposition bath 12 after passing through the primary reactor and in FIG. 2 the fiber 11 is conducted into the liquid deposition bath 12 after leaving the drawing mechanism 22. The liquid deposition bath 12 includes heating means 13, stirring means 14, inlet 15, and outlet 16. The heating means 13 may be a hot plate, an electrical heating coil, or any other means which will maintain the temperature of the bath at the level necessary of the ionic materials in the solution and deposition of the metal ions onto the primary coating. The maintenance of the temperature level of the liquid deposition bath is an important consideration in the deposition of the secondary coating. The bath temperatures necessary for various metallic coatings are given in Tables I and II.

The stirring means 14 may be any device which will cause movement of the liquid depostion bath 12 so as to allow the even distribution of the ionic elements throughout the solution thereby permitting deposition of a more uniform coating.

The secondary coating 42 may be of a metallic composition which is the same as or different from the metallic composition of the primary coating 41 on which it is being deposited.

The process of applying a coating onto an optical fiber from a liquid medium may be achieved by using either an electrodeposition process or an "electroless" deposition process. The electroless deposition process is the process of depositing a metal without utilizing electrodes.

Where long lengths of fiber are being processed, it is preferable to employ an "electroless" deposition process, so that a continuous drawing speed may be maintained throughout the entire length of the coating apparatus.

In the electroless deposition process, referring to FIG. 1, the coating deposited from the liquid deposition bath 12 is applied directly to the optical fiber with metallic primary coating. Again, the primary coating may be deposited by the HNTD process or any other suitable process.

The electroless deposition of nickel is based on the controlled, autocatalytic reduction of nickel cations at elevated temperature by means of hypophosphite anions in aqueous solution. The probable reactions are:

$$(H_2PO_2)^- + H_2O \rightarrow H^+ + (HPO_3)^{--} 2H(catal) \quad (1)$$

$$Ni^{++} + 2H(catal) \rightarrow Ni + 2H^+ \quad (2)$$

Hypophosphite ion is dehydrogenated in presence of water. The active hydrogen reduce the nickel ions to metallic nickel. Electroless plating can produce uniform thickness on all areas of the fiber. Properly applied coatings are dense and often relatively nonporous. The coating usually exhibits high corrosion resistance.

The following Table I lists the plating bath compositions for "electroless" plating of nickel, iron and nickel-iron alloy. Here, also, the correct temperature of the bath is essential to insure proper deposition of the secondary coatings. For the deposition of nickel the bath temperature is approximately 194° F., for iron 170°–195° F. and for nickel-iron alloy 70°–80° F.

TABLE I

| Electroless Deposition on Primary Metallic Coating | | | |
|---|---|---|---|
| Metal | Plating Bath Composition | Bath Temperature (°F.) | pH |
| Ni | $NiCl_2$—$6H_2O$ $NaH_2PO_2$ | 194 | 4–6 |
| Fe | $FeSO_4$—$6H_2O$ Rochelle Salt $NaH_2PO_2$ | 170–195 | 8–10 |
| Ni—Fe alloy | $NiSO_4$—$6H_2O$ $FeSO_4$—$6H_2O$ Na-citrate | 70–80 | 4–8 |

In FIG. 1 it may be seen that the fiber 17 which has acquired both a primary and a secondary coating is conducted through the interior of the polymer coater 18 after emerging from the liquid deposition bath 12. The polymer coater 18 is of conventional construction so that no details thereof need be discussed here. Suffice it to say that at least one additional layer of coating of an organic material such as a polymer, is applied on top of the aforementioned hermetic coatings produced in the reactor 8 and liquid deposition bath 12. After this polymer coating 43 has been applied, the fiber 41 passes through the curing oven 20 where the polymer coating 43 is cured, especially by applying heat thereto, to give such a coating the desired properties. Even the construction of the curing oven 20 is conventional and will not be described here. Finally, the now coated fiber 21 reaches the drawing mechanism or spool 22 to be wound thereon for at least temporary storage purposes.

In the electrodeposition process, referring to FIG. 2, a source of electric current 24 is provided to the liquid deposition bath 12 to cause the formation of a secondary metallic coating onto the primary metallic coating.

In this process, it is preferable that the fiber be in a static condition. Therefore, the fiber will continue to be drawn and wound on the drawing mechanism 22 until such time as electrodeposition is to be performed. At that time, the fibers are cut by cutting means 23 into lengths of fiber which will fit into the liquid bath 12. Hence, short lengths of fiber of approximately one meter are especially adapted to this process.

In order for current to be applied through the liquid deposition bath, two electrodes are provided. The cathode terminal is connected to a metal plate 26 from which the short lengths of fiber are suspended. An anode terminal 25 may be made of the same metal that is to be plated or any other material which will act as a conductor but not be affected by the chemicals of the bath. The metals to be plated out of the bath include nickel, chromium or iron or any other metal suitable for adhering to the primary metallic coating 41. The following Table II gives the bath compositions and anode materials for nickel, chromium and iron. Table II also includes the reaction temperatures for nickel, chromium and iron. The surface temperature of the fiber as it enters the liquid deposition bath 12 should be at room temperature so that the reaction conditions such as ionic concentration at the location of the deposition of the secondary coating 42 will not be adversely affected.

The thickness, uniformity and adherence characteristics of the secondary metallic coating 42 can be more precisely controlled by varying parameters, such as electrolyte composition, ion concentration, current density and anodic and cathodic overpotentials. Table II also lists preferred current densities and pH values for the three given metals. In addition, the geometric shape of the container holding the liquid deposition bath may be varied to change the ionic flux at the area adjacent the fiber surface. Also, agitation of the bath solution will increase the movement of the ions and hence increase the deposition rate and in turn the coating thickness.

TABLE II

| Electrodeposition on Primary Metallic Coating | | | | | |
|---|---|---|---|---|---|
| Metal | Plating Bath Composition | Bath Temperature (°F.) | pH | Current Density (A/ft$^2$) | Anode |
| Ni | $NiSO_4$—$6H_2O$ $NiCl_2$—$6H_2O$ Boric Acid | 130 | 2–5 | 10–60 | Nickel (cast or rolled) |
| Cr | $CrO_3$ $H_2SO_4$ | 110–120 | | 100 | Lead (6% Sb,Sn) |
| Fe | $FeSO_4$—$7H_2O$ $FeCl_2$—$4H_2O$ | 100 | 4.5–6.0 | 50–100 | Low Carbon Steel |

If desired, the short lengths of fiber 17 which have acquired both a primary and a secondary coating may then be passed through the interior of the polymer coater 18 for the application of at least one additional layer of coating of an organic material, such as a polymer. After the polymer coating 43 has been applied, the fiber 19 passes through the curing oven 20 where the polymer coating 43 is cured.

While we have described above the principles of our invention in connection with specific apparatus, it is to be clearly understood that this description is made only by way of example and not as a limitation to the scope of our invention as set forth in the objects thereof and in the accompanying claims.

We claim:
1. A method of producing coated optical fibers comprising the steps of:
   forming an optical fiber from a preform;
   coating the fiber with a primary metallic coating;
   providing a liquid medium which includes a metal containing composition;
   immersing the fiber in the liquid medium;

maintaining the primary coating and the liquid medium at substantially the same electric potential;

adding to the liquid medium a reactant which is capable of inducing release of the metal from the composition at a predetermined temperature and deposition thereof onto the primary coating;

bringing the temperature of the liquid medium to the predetermined temperature; and maintaining the temperature of the liquid medium at the predetermined temperature for a time sufficient for deposition to occur.

2. The method of claim 1 wherein the at least one reactant is a compound containing a metal selected from the group consisting of nickel, iron and a nickel-iron alloy.

3. The method of claim 2 wherein the metal selected is nickel and the predetermined temperature for the nickel compound is approximately 194° F.

4. The method of claim 2 wherein the metal selected is iron and the predetermined temperature for the iron compound is approximately 170°–195° F.

5. The method of claim 2 wherein the metal selected is a nickel-alloy and the predetermined temperature for the nickel-iron alloy is approximately 70°–80° F.

6. The method of claim 1 further comprising the step of agitating the liquid medium during the immersing step in order to increase the deposition rate of the secondary coating.

* * * * *